United States Patent Office 3,314,935
Patented Apr. 18, 1967

3,314,935
MONOAZO DYESTUFFS
Gerald Booth, George Trapp Douglas, James Stuart Hunter, and Eric Leslie Johnson, Manchester, England, assignors to Imperial Chemical Industries Limited, London, England, a corporation of Great Britain
No Drawing. Filed Jan. 3, 1964, Ser. No. 335,661
Claims priority, application Great Britain, Oct. 4, 1957, 31,143/57
4 Claims. (Cl. 260—206)

This application is a continuation-in-part of our now abandoned application, Ser. No. 144,319, which was filed in the United States Patent Office on Oct. 11, 1961, and which is a continuation-in-part of, our now abandoned, application Ser. No. 762,924, which was filed in the United States Patent Office on Sept. 24, 1958.

This invention relates to monoazo dyestuffs and more particularly it relates to disperse, i.e. water-insoluble, monoazo dyestuffs which are valuable for colouring synthetic textile materials in particular polyamide and cellulose acetate textile materials.

According to the invention there are provided the monoazo dyestuffs of the formula:

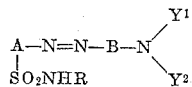

wherein A is an arylene radical selected from the class consisting of phenylene and naphthylene radicals, and any further substituents on said phenylene radical are selected from the class consisting of chlorine, bromine, lower alkyl, lower alkoxy and trifluoromethyl;

R is selected from the class consisting of $\beta$-chloroethyl, $\beta$-bromoethyl; $\beta$:$\gamma$-dichloropropyl, $\beta$:$\gamma$-dibromopropyl, $\gamma$-chloro-$\beta$-hydroxypropyl and $\gamma$-bromo-$\beta$-hydroxypropyl;

B is an arylene radical selected from the class consisting of 1:4-phenylene, 1:4-naphthylene and 1:2-naphthylene radicals, and any further substituents on said arylene radical are selected from the class consisting of chlorine, bromine, lower alkyl, lower alkoxy and acetylamino;

$Y^1$ is selected from the class consisting of hydrogen, lower alkyl, hydroxy lower alkyl, acetoxy lower alkyl, and $\beta$-lower alkoxyethyl; and $Y^2$ is selected from the class consisting of hydrogen, lower alkyl, hydroxy lower alkyl, $\beta$-aminoethyl, $\beta$-cyanoethyl, and acetoxy lower alkyl.

As examples of the lower alkyl radicals which may be present as substituents on the said arylene radicals represented by A and B there may be mentioned alkyl radicals containing from 1 to 4 carbon atoms, in particular methyl and ethyl radicals. As examples of the lower alkoxy radicals which may be present as substituents on the said arylene radicals represented by A and B there may be mentioned alkoxy radicals containing from 1 to 4 carbon atoms, in particular methoxy and ethoxy radicals.

As examples of the lower alkyl radicals represnted by $Y^1$ and $Y^2$ there may be mentioned methyl, ethyl, propyl and butyl radicals. As examples of the hydroxy lower alkyl radicals represented by $Y^1$ and $Y^2$ there may be mentioned $\beta$-hydroxyethyl and $\beta$- or $\gamma$-hydroxypropyl radicals. As examples of the $\beta$-lower alkoxy radicals represented by $Y^1$ there may be mentioned $\beta$-methoxyethyl and $\beta$-ethoxyethyl radicals. As examples of the acetoxy lower alkyl radicals represented by $Y^1$ and $Y^2$ there may be mentioned $\beta$-acetoxy-ethyl and $\beta$- or $\gamma$-acetoxypropyl radicals.

The monoazo dyestuffs of the invention can be obtained by diazotising an amine of the formula:

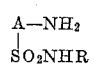

wherein A and R have the meanings stated, and coupling the resulting diazo compound with a coupling component of the formula:

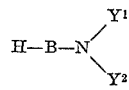

wherein B, $Y^1$ and $Y^2$ have the meanings stated.

This reaction can be conveniently carried out by adding an aqueous solution of sodium nitrite to a solution or suspension of the amine in a dilute aqueous solution of hydrochloric acid or in a mixture of acetic acid and an aqueous solution of hydrochloric acid, thereafter adding the resulting mixture containing the diazo compound to a solution of the coupling component in a dilute aqueous solution of hydrochloric acid, adding sodium acetate to increase the pH of the mixture preferably to a pH of about 5, and stirring the resulting mixture to effect formation of the monoazo dyestuff. The monoazo dyestuff is then isolated by conventional methods.

As examples of amines of the above formula there may be mentioned:

2-, 3- or 4-aminobenzenesulphon-N-($\beta$-chloroethyl)-amide,
2-, 3- or 4-aminobenzenesulphon-N-($\beta$-bromoethyl)-amide,
2-naphthylamine-5-, 6-, 7- or 8-sulphon-N-($\beta$-chloroethyl)amide,
1-naphthylamine-4-, 5-, 6- or 7-sulphon-N-($\beta$-chloroethyl)amide,
3-chloro-4-aminobenzenesulphon-N-($\beta$-chloroethyl)amide,
2:5-dichloro-4-aminobenzenesulphon-N-($\beta$-chloroethyl)amide,
2-, 3- or 4-aminobenzenesulphon-N-($\gamma$-chloro-$\beta$-hydroxypropyl)amide,
2-, 3- or 4-aminobenzenesulphon-N-($\gamma$-bromo-$\beta$-hydroxypropyl)amide,
2-, 3- or 4-aminobenzenesulphon-N-($\beta$:$\gamma$-dichloropropyl)amide,
2-, 3- or 4-aminobenzenesulphon-N-($\beta$:$\gamma$-dibromopropyl)amide,
2-anisidine-4-sulphon-N-($\beta$-chloroethyl)amide,
2-anisidine-4-sulphon-N-($\gamma$-chloro-$\beta$-hydroxypropyl)amide,
2-anisidine-4-sulphon-N-($\gamma$-bromo-$\beta$-hydroxypropyl)amide,
2-amino-4-trifluoromethylbenzenesulphon-N-($\beta$-chloroethyl)amide,
3-bromo-4-aminobenzenesulphon-N-($\beta$-chloroethyl)amide,
3-chloro-4-amino-5-methylbenzenesulphon-N-($\beta$-chloroethyl)amide,
3:5-dichloro-4-aminobenzenesulphon-N-($\beta$-chloroethyl)amide, and
2:5-dichloro-4-aminobenzenesulphon-N-($\gamma$-chloro-$\beta$-hydroxypropyl)amide.

The amines of the above formula can themselves be obtained by reacting a compound of the formula:

$$A-T$$
$$|$$
$$SO_2Cl$$

wherein T represents a nitro or acetylamino group with an amine of the formula $RNH_2$ wherein A and R have the meanings stated, and subsequently converting the group represented by T to an amino group by reduction or by hydrolysis.

As examples of coupling components of the above formula there may be mentioned:

N:N-dimethylaniline,
N:N-diethylaniline,
N-methyl-N-(β-hydroxyethyl)aniline,
N:N-di(β-hydroxyethyl)aniline,
N:N-di(β-hydroxyethyl)-m-toluidine,
N:N-di(β-hydroxyethyl)-m-chloroaniline,
N:N-di(β-hydroxyethyl)-m-bromoaniline,
N:N-di(β-hydroxyethyl)-2-methoxy-5-methylaniline,
2-methoxy-1-naphthylamine,
2-ethoxy-1-naphthylamine,
N-(β-hydroxyethyl)-1-naphthylamine,
N-(β-hydroxyethyl)-2-naphthylamine,
1-N-(β-hydroxyethyl)amino-4-chloronaphthalene,
1-N-(β-hydroxyethyl)amino-5:8-dichloronaphthalene,
N-(β-hydroxyethyl)-N-(β-aminoethyl)aniline,
N-(β-hydroxyethyl)-N-(β-cyanoethyl)-m-toluidine
2-[N:N-di(β-hydroxyethyl)amino]-4-acetylaminoanisole,
N:N-diethyl-3-acetylaminoaniline,
N-n-butyl-N-(β-hydroxyethyl)-m-toluidine,
N-(β-ethoxyethyl)-N-(β-cyanoethyl)-m-toluidine,
N-(β-hydroxyethyl)-m-toluidine, and
N:N-di(β-acetoxyethyl)-m-toluidine.

The water-insoluble monoazo dyestuffs of the invention may be used for the colouration of textile materials comprising animal fibres such as wool, silk and regenerated protein fibres, and artificial fibres such as celulose ester fibres for example secondary cellulose acetate and cellulose triacetate fibres, synthetic linear polyamide fibres especially polyhexamethylene adipamide, and polycaprolactam fibres, polyurethane, polyester, polyacrylonitrile and modified polyacrylonitrile fibres, by treating the textile materials with aqueous dispersions of the said dyestuffs. The aqueous dispersions of the dyestuffs may be obtained by methods known and described for disperse dyestuffs in general, for example by milling the dyestuffs in the presence of dispersing agents for example the sodium salt of sulphonated naphthalene formaldehyde condensation products with or without the addition of protective colloids for example dextrin. The dyestuffs may, if desired, be converted into a dispersible powder form. Substances known to assist or improve dyeing, for example the dispersing agents and protective colloids described above and electrolytes, may be added to the dyebath.

The said dyestuffs may be applied to the textile materials at a temperature at or near the boiling point of the dyebath, preferably at a temperature between 75° C. and 100° C., or if desired, a higher temperature, for example a temperature between 100° C. and 130° C., may be used at superatmospheric pressure. Textile materials which are not stable at temperatures above 90° C., for example secondary cellulose acetate, are preferably dyed at temperatures between 60° C. and 85° C.

In the dyeing of cellulose triacetate or polyester textile materials with the dyestuffs of the invention it is sometimes advantageous to use a swelling agent or other "carrier" material for example diphenyl, dichlorobenzene, or trichloroethylene.

The monoazo dyestuffs may also be applied to textile materials in the form of thickened printing pastes containing a fine dispersion of the dyestuffs. The printing pastes may be thickened with any of the usual thickening agents for example with methyl cellulose, locust bean gum, Nafka crystal gum, or sodium alginate, and may contain normal adjuvants for printing pastes such as urea, thiourea or thiodiglycol, adjuvants for the application of disperse dyes such as methylated spirits, sodium metanitrobenzenesulphonate or aqueous emulsions of sulphonated oils, swelling agents or dyeing "carriers" such as diphenyl. The printing pastes may be conveniently applied to the textile materials by printing with block, spray, stencil, screen or roller, preferably drying the printed materials and if desired steaming at superatmospheric pressure, when a temperature above 100° C., preferably between 110° C. and 130° C., is required.

The monoazo dyestuffs are of especial value for printing cellulose acetate textile materials.

If desired the monoazo dyestuffs, as hereinbefore defined, may be applied to artificial textile materials in conjunction with a treatment with an amine, phenol or thiophenol, which may be applied to the textile material prior to, simultaneously with or subsequent to the application of the dyestuffs.

When used on textile materials comprising wool, silk or regenerated protein fibres or artificial fibres such as polyamide fibres or basically modified polyacrylonitrile fibres the monoazo dyestuffs, as hereinbefore defined, give colourations distinguished by their high fastness to wet treatments and to dry heat treatments. They also have excellent dyeing properties, especially build-up and levelling properties, and on this account they are of great value for application to barré nylon. In many cases also the said monoazo dyestuffs have excellent fastness to light.

A preferred class of the monoazo dyestuffs of the invention comprises the monoazo dyestuffs which are represented by the formula:

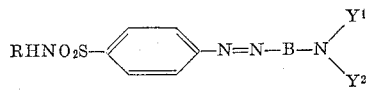

wherein R, B, $Y^1$ and $Y^2$ have the meanings stated, and any further substituents on the benzene ring are selected from the class consisting of chlorine, bromine, lower alkyl, lower alkoxy and trifluoromethyl.

A second preferred class of the monoazo dyestuffs of the invention comprises the monoazo dyestuffs which are represented by the formula:

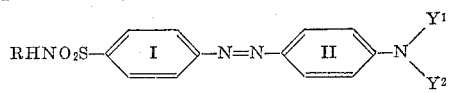

wherein R, $Y^1$ and $Y^2$ have the meanings stated; any further substituents on the benzene ring I being selected from the class consisting of chlorine, bromine, lower alkyl, lower alkoxy and trifluoromethyl; and any further substituents on the benzene ring II being selected from the class consisting of chlorine, bromine, lower alkyl, lower alkoxy and acetylamino.

It is further preferred that R represents the β-chloroethyl radical.

It is also preferred that $Y^1$ and $Y^2$ each represent a β-hydroxyethyl radical.

A third preferred class of the monoazo dyestuffs of the invention comprises the monoazo dyestuffs which are represented by the formula:

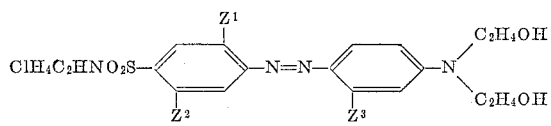

wherein $Z^1$ and $Z^2$ are each independently selected from the class consisting of hydrogen and chlorine; and $Z^3$ is selected from the class consisting of hydrogen, lower alkyl, lower alkoxy, chlorine, bromine and acetylamino.

The invention is illustrated but not limited by the following examples in which the parts and percentages are by weight.

Examples 1

A solution of 6.9 parts of sodium nitrite in 50 parts of water is added gradually to a solution of 27.1 parts of 4 - aminobenzenesulphon-N-(β-chloroethyl)amide hydrochloride in a mixture of 400 parts of water and 15 parts of a 36% aqueous solution of hydrochloric acid at a temperature between 15° C. and 20° C. The solution so obtained is added during 20 minutes to a solution of 16.5 parts of N-ethyl-N-β-hydroxyethylaniline in a mixture of 200 parts of water and 11.2 parts of a 36% aqueous solution of hydrochloric acid at a temperature between 0° C. and 5° C. After stirring the mixture for 2 hours it is neutralized to Congo red by adding 55 parts of a 30% aqueous solution of sodium acetate slowly over 30 minutes. After 5 minutes the insoluble 4-(β-chloroethyl) aminosulphonyl-4' - N - ethyl-N-(β-hydroxyethyl)amino-azobenzene is filtered off, washed with water and dried.

1 part of the product so obtained is dispersed in 20 parts of water by milling in the presence of a sodium salt of a sulphonated naphthalene formaldehyde condensation product and the dispersion so obtained is added to 4000 parts of water containing 4 parts of a condensate of ethylene oxide with a fatty alcohol. 100 parts of nylon (polyamide) textile material are placed in the dyebath so obtained and the dyebath is then heated to 95° C. and maintained at that temperature for 60 minutes. The nylon fabric is then rinsed in water, immersed for 30 minutes in a hot aqueous solution containing 0.2% of sodium carbonate and 0.1% of a condensate of ethylene oxide with an alkyl phenol, again rinsed with water and dried. The polyamide textile material is dyed to an orange shade of very good fastness to washing.

Polyhexamethylene adipamide or polycaprolactam may be used as the nylon (polyamide) textile material in this example and throughout the following examples.

If the polyamide textile material is replaced by 100 parts of secondary cellulose acetate and the dyebath is heated at 85° C. for 60 minutes the cellulose acetate is dyed to an orange shade.

Example 2

The 16.5 parts of N-ethyl-N-β-hydroxyethylaniline used in Example 1 are replaced by 19.5 parts of N:N-di(β-hydroxyethyl)-m-toluidine. 4 - (β - chloroethyl) aminosulphonyl-2' - methyl-4'-N:N-di(β-hydroxymethyl) aminoazobenzene is obtained which dyes secondary cellulose acetate in orange shades and polyamide textile materials in orange shades of very good fastness to washing.

The degree of fixation of the dyestuff on the dyed nylon is determined as follows:

The dyed polyamide textile material is successively extracted with n-propanol at 85° C. until no more dyestuff is removed from the nylon on further treatment with n-propanol. The quantity of dyestuff remaining in the polyamide textile material is then found by dissolving the polyamide textile material in o-chlorophenol and determining the dyestuff colorimetrically. Comparison with the quantity of dyestuff found in the same way to be present in an identical weight of similarly dyed polyamide textile material before extraction with n-propanol gives the degree of fixation as 69%.

In a similar test on polyamide textile material dyed with 4-(beta-hydroxyethyl)aminosulphonyl-2'-methyl-4'-N:N-di(beta - hydroxyethyl)aminoazobenzene the whole of the dyestuff was extracted by the n-propanol at 85° C.

Example 3

30.55 parts of 3-chloro-4-aminobenzenesulphon-N-β-chloroethylamide hydrochloride are dissolved by warming in a mixture of 200 parts of acetic acid and 15 parts of a 36% aqueous solution of hydrochloric acid and the solution cooled to a temperature between 15° C. and 20° C. To the suspension so obtained is added over 10 minutes a solution of 6.9 parts of sodium nitrite in 50 parts of water. 200 parts of water are then added and the resulting suspension of diazonium compound is added over 20 minutes to a solution of 19.5 parts of N:N-di(β-hydroxyethyl)-m-toluidine in a mixture of 180 parts of water and 18 parts of a 36% aqueous solution of hydrochloric acid at a temperature between 0° C. and 5° C. The mixture is stirred for 30 minutes, neutralised to Congo red by slowly adding 70 parts of a 30% aqueous solution of sodium acetate and then stirred for a further 5 minutes. 2 - chloro-4-(β-chloroethyl)aminosulphonyl-2'-methyl-4':N:N-di(β - hydroxyethyl)aminoazobenzene so obtained is then filtered off, washed with water and dried. When dispersed in aqueous medium it dyes secondary cellulose acetate to reddish-orange shades and polyamide textile materials to scarlet shades of very good fastness to washing.

The fixation of the dyestuff on the dyed nylon is 69%.

Example 4

A solution of 6.9 parts of sodium nitrite in 50 parts of water is added gradually to a solution at 10° C. of 27.1 parts of 3-aminobenzenesulphon-N-(β-chloroethyl)amide hydrochloride in a mixture of 480 parts of water and 15 parts of a 36% aqueous solution of hydrochloric acid. The resulting solution is added during 10 minutes to a solution of 18.1 parts of N:N-di(β-hydroxyethyl)aniline in a mixture of 200 parts of water and 10 parts of a 36% aqueous solution of hydrochloric acid at a temperature of between 0° C. and 5° C. The mixture is neutralized to Congo red by the addition of 50 parts of a 30% aqueous solution of sodium acetate and after 12 hours the resulting dye is filtered off, washed with water and dried. When dispersed in aqueous medium it dyes polyamide textile materials in orange shades of good fastness to washing.

Example 5

The 18.1 parts of di(β-hydroxyethyl)aniline used in Example 4 are replaced by 19.5 parts of N:N-di(β-hydroxyethyl) - m - toluidine. 3-(β-chloroethyl)amino-sulphonyl-2'-methyl-4'-N:N - di(β-hydroxyethyl)amino-azobenzene is obtained which dyes polyamide textile materials in orange shades of good fastness to washing.

Example 6

27.1 parts of 4 - aminobenzenesulphon - N-(β-chloro-ethyl)amide hydrochloride are diazotised according to the method of Example 1 and the resulting solution is added during 20 minutes to a solution of 19.9 parts of N-β-cyanoethyl-1-naphthylamine in 800 parts of acetone at a temperature between 0° C. and 5° C. The mixture is stirred for 90 minutes and then neutralized to Congo red by slowly adding 25 parts of a 30% aqueous solution of sodium acetate. The dyestuff is filtered off, washed with water and dried. When dispersed in aqueous medium it dyes cellulose aceate rayon in orange shades and polyamide textile materials in scarlet shades of very good fastness to washing. The fixation of the dyestuff on the dyed polyamide textile material is 68%.

Example 7

A solution of 6.9 parts of sodium nitrite in 50 parts of water is added to a solution of 27.1 parts of 2-aminobenzenesulphon-N-(β-chloroethyl)amide in a mixture of 130 parts of acetic acid and 4 parts of a 36% aqueous solution of hydrochloric acid at a temperature between 10° C. and 15° C. The solution is stirred for 15 minutes and then added during 20 minutes to a solution of 19.5 parts of N:N-di(β-hydroxyethyl)m-toluidine in a mixture of 200 parts of water and 12 parts of a 36% aqueous solution of hydrochloric acid at a temperature of between 0° and 5° C. The mixture is stirred for 2 hours and then neutralised to Congo red by slowly adding 40 parts of a 30% aqueous solution of sodium acetate. The dyestuff is filtered off, washed and dried. When dispersed in aqueous medium it dyes polyamide textile materials in orange shades of excellent fastness to washing and wool in orange shades of good fastness to washing and milling.

*Example 8*

A solution of 6.9 parts of sodium nitrite in 50 parts of water is added during 5 minutes to a solution of 30.1 parts of 4-aminobenzenesulphon-N-(γ-chloro-β-hydroxypropyl)amide hydrochloride in a mixture of 375 parts of water and 15 parts of a 36% aqueous solution of hydrochloric acid at a temperature of between 5° and 10° C. The solution so obtained is added during 20 minutes to a solution of 19.5 parts of N:N-di(β-hydroxyethyl)-m-toluidine in 250 parts of water and 15 parts of a 36% aqueous solution of hydrochloric acid at a temperature of 0° and 5° C. After stirring the mixture for 2 hours it is neutralised to Congo red by adding 62.5 parts of a 30% aqueous solution of sodium acetate slowly over 30 minutes. The insoluble product is filtered off, stirred for 30 minutes in 400 parts of water which have been made alkaline to litmus by the addition of sodium carbonate, filtered off, washed with water and dried. 4-(γ-chloro-β-hydroxypropyl) - aminosulphon - 2' - methyl - 4' - N:N-di(β-hydroxyethyl)aminoazobenzene is obtained which has very good build-up properties on polyamide textile materials giving orange shades of good fastness to washing.

*Example 9*

A solution of 6.9 parts of sodium nitrite in 50 parts of water is added gradually to a suspension of 26.9 parts of 4-amino-3-chlorobenzene sulphon-N-(β-chloroethyl)-amide in a mixture of 400 parts of water and 25 parts of a 36% aqueous solution of hydrochloric acid at a temperature between 5° and 10° C. The suspension so obtained is then added during 20 minutes to a solution of 19.6 parts of N-β-cyanoethyl-1-naphahylamine in a mixture of 512 parts of acetone and 12 parts of a 36% aqueous solution of hydrochloric acid at a temperature of between 0° C. and 5° C. The mixture is stirred for 2¼ hours, 68 parts of a 30% aqueous solution of sodium acetate are added, the mixture then stirred for a further 16 hours 6 parts of the sodium acetate solution added. The precipitated dyestuff is then filtered, washed with water and dried. When dispersed in aqueous medium it dyes polyamide textile materials in red shades possessing excellent fastness to washing.

The following table gives further examples of monoazo dyestuffs of the invention which are obtained by diazotising the amines listed in the second column of the table and coupling the resulting diazo compounds with the coupling components listed in the third column of the table by methods similar to those described in the previous examples. The fourth column of the table gives the shades obtained when the dyestuffs are applied to polyamide textile materials.

| Example | Amine | Coupling Component | Shade |
|---|---|---|---|
| 10 | 4-aminobenzenesulphon-N-(β-chloroethyl)amide | N:N-di(β-hydroxyethyl)amino-2-methoxy-5-methyl-benzene. | Reddish-orange. |
| 11 | do | N-(β-hydroxyethyl)-N-(β-aminoethyl)aniline | Reddish-yellow. |
| 12 | do | N-(β-hydroxyethyl)-N-(β-cyanoethyl)-m-toluidine | Yellowish-orange. |
| 13 | do | N-(β-hydroxyethyl)-1-naphthylamine | Red. |
| 14 | do | N-(β-hydroxyethyl)-2-naphthylamine | Red. |
| 15 | do | N:N-di(β-hydroxyethyl)aniline | Orange. |
| 16 | do | N-(β-hydroxyethyl)-N-(β-cyanoethyl)aniline | Reddish-yellow. |
| 17 | do | 2-[N:N-di(β-hydroxyethyl)amino]-4-acetyl-aminoanisole. | Red. |
| 18 | do | 1-N-β-hydroxyethylamino-5:8-dichloronaphthalene | Red. |
| 19 | do | 1-N-β-hydroxyethylamino-4-chloronaphthalene | Pink. |
| 20 | do | 2-ethoxy-1-naphthylamine | Bluish-red. |
| 21 | 4-amino-3-chlorobenzenesulphon-N(β-chloroethyl)-amide. | N:N-di(β-hydroxyethyl)amino-2-methoxy-5-methyl-benzene. | Red. |
| 22 | do | N-(β-hydroxyethyl)-N-(β-cyanoethyl)aniline | Orange. |
| 23 | do | N-n-butyl-N-(β-hydroxyethyl)-m-toluidine | Scarlet. |
| 24 | do | N-(β-hydroxyethyl)-1-naphthylamine | Maroon. |
| 25 | do | N-(β-hydroxyethyl)-N-(β-cyanoethyl)-m-toluidine | Reddish-orange. |
| 26 | do | N-(β-hydroxyethyl)-2-naphthylamine | Red. |
| 27 | do | N:N-di(β-hydroxyethyl)aniline | Reddish-orange. |
| 28 | do | 2-[N:N-di(β-hydroxyethyl)amino]-4-acetyl-aminoanisole. | Bluish-red. |
| 29 | do | 2-ethoxy-1-naphthylamine | Reddish-violet. |
| 30 | do | 1-N-(β-hydroxyethyl)amino-4-chloro-naphthalene | Bluish-red. |
| 31 | do | N-(β-ethoxyethyl)-N-(β-cyanoethyl)-m-toluidine | Orange. |
| 32 | 2-anisidine-4-sulphon-N-(γ-chloro-β-hydroxypropyl)amide. | N:N-di(β-hydroxyethyl)-m-toluidine | Do. |
| 33 | 2-anisidine-4-sulphon-N-(β-chloroethyl)amide. | N-β-hydroxyethyl-1-naphthylamine | Red. |
| 34 | 4-aminobenzenesulphon-N-(β:γ-dichloropropyl)-amide. | N:N-di(β-hydroxyethyl)-m-toluidine | Orange. |
| 35 | 2-amino-4-trifluoromethylbenzene-sulphon-N-(β-chloroethyl)amide. | do | Scarlet. |
| 36 | 4-aminobenzenesulphon-N-(γ-bromo-β-hydroxypropyl)amide. | do | Orange. |
| 37 | 4-aminobenzenesulphon-N-(β-bromoethyl)amide | do | Do. |
| 38 | 2-aminobenzenesulphon-N-(β-chloroethyl)amide | N-(β-hydroxyethyl)-1-naphthylamine | Red. |
| 39 | 2-amino-4-trifluoromethylbenzene-sulphon-N-(β-chloroethyl)amide. | do | Red. |
| 40 | 3-aminobenzenesulphon-N-(γ-chloro-β-hydroxypropyl)amide. | N:N-di(β-hydroxyethyl)-m-toluidine | Orange. |
| 41 | 4-aminobenzenesulphon-N-(β:γ-dibromopropyl)-amide. | do | Do. |
| 42 | 2:5-dichloro-4-aminobenzenesulphon-N-(β-chloroethyl)amide. | do | Red. |
| 43 | 4-amino-3-bromobenzenesulphon-N-(β-chloroethyl)amide. | do | Scarlet. |
| 44 | 4-amino-3-chloro-5-methylbenzenesulphon-N-(β-chloroethyl)amide. | do | Orange. |
| 45 | 4-amino-3:5-dichlorobenzenesulphon-N-(β-chloroethyl)amide. | do | Yellowish-brown. |
| 46 | 4-aminobenzenesulphon-N-(β-chloroethyl)amide | N:N-di(β-hydroxyethyl)amino-3-chlorobenzene | Orange |
| 47 | 4-amino-3-chlorobenzenesulphon-N-(β-chloroethyl)amide | N:N-di(β-acetoxyethyl)-m-toluidine | Reddish-orange. |
| 48 | do | N:N-di(β-hydroxyethyl)-m-anisidine | Do. |
| 49 | 4-aminobenzenesulphon-N-(β-chloroethyl)-amide | N:N-diethyl-m-toluidine | Orange. |
| 50 | do | N-methyl-m-toluidine | Do. |
| 51 | 1-naphthylamine-4-sulphon-N-(β-chloroethyl)amide | N:N-di(β-hydroxyethyl)-m-toluidine | Red. |
| 52 | 2-naphthylamine-5-sulphon-N-(β-chloroethyl)amide | do | Orange. |
| 53 | 2-naphthylamine-6-sulphon-N-(β-chloroethyl)amide | do | Do. |
| 54 | 4-aminobenzenesulphon-N-(β-chloroethyl)-amide | N:N-di(β-hydroxyethyl)-3-bromobenzene | Do. |
| 55 | do | N:N-di(β-hydroxyethyl)amino-3-acetylaminobenzene. | Do. |

What we claim is:
1. The monoazo dyestuffs of the formula:

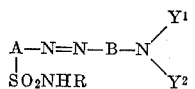

wherein
A is an arylene radical selected from the class consisting of phenylene and naphthylene radicals and any further substituents on said phenylene radical are selected from the class consisting of chlorine, bromine, lower alkyl, lower alkoxy and trifluoromethyl;
R is selected from the class consisting of β-chloroethyl, β-bromoethyl, β:γ-dichloropropyl, β:γ-dibromopropyl, γ-chloro-β-hydroxypropyl and γ-bromo-β-hydroxypropyl;
B is an arylene radical selected from the class consisting of 1:4-phenylene, 1:4-naphthylene and 1:2-naphthylene radicals, and any further substituents on said arylene radical are selected from the class consisting of chlorine, bromine, lower alkyl, lower alkoxy and acetylamino;
$Y^1$ is selected from the class consitsing of hydrogen, lower alkyl, hydroxy lower alkyl, acetoxy lower alkyl and β-lower alkoxy ethyl;
and $Y^2$ is selected from the class consitsing of hydrogen, lower alkyl, hydroxy lower alkyl, β-aminoethyl, β-cyanoethyl and acetoxy lower alkyl.

2. Monoazo dyestuffs as claimed in claim 1 wherein $Y^1$ and $Y^2$ each represent the β-hydroxyethyl radical.
3. Monoazo dyestuffs as claimed in claim 1 wherein A is a phenylene radical and the —$SO_2NHR$ group is attached to A in para postion to the azo group.
4. The monoazo dyestuffs of the formula:

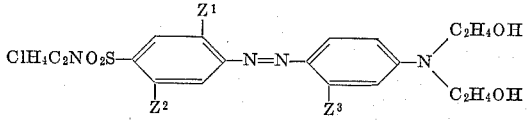

wherein $Z^1$ and $Z^2$ are independently selected from the class consisting of hydrogen and chlorine; and $Z^3$ is selected from the class consisting of hydrogen, chlorine, bromine, lower alkyl, lower alkoxy and acetylamino.

References Cited by the Examiner
UNITED STATES PATENTS

| | | | |
|---|---|---|---|
| 2,766,231 | 10/1956 | Bolliger | 260—163 |
| 3,050,516 | 8/1962 | Merian et al. | 260—205 |
| 3,154,533 | 8/1964 | Eisele et al. | 260—199 X |

FOREIGN PATENTS

| | | |
|---|---|---|
| 664,258 | 1/1952 | Great Britain. |

CHARLES B. PARKER, *Primary Examiner.*
FLOYD D. HIGEL, *Assistant Examiner.*